Dec. 1, 1953
G. A. BRACE
2,661,025
FLEXIBLE HOSE
Filed April 3, 1948
2 Sheets-Sheet 1
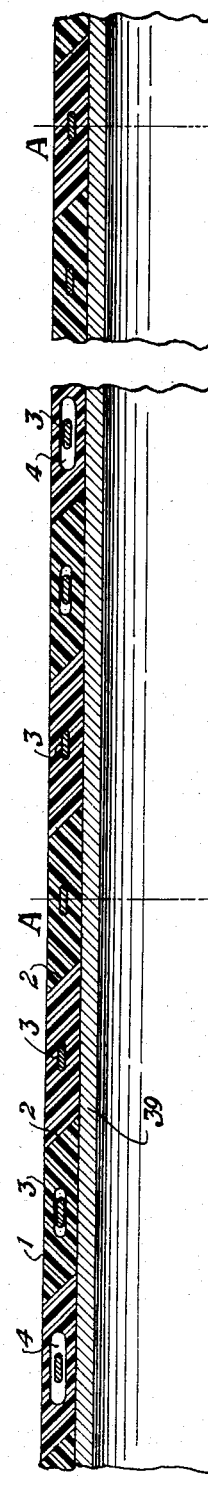
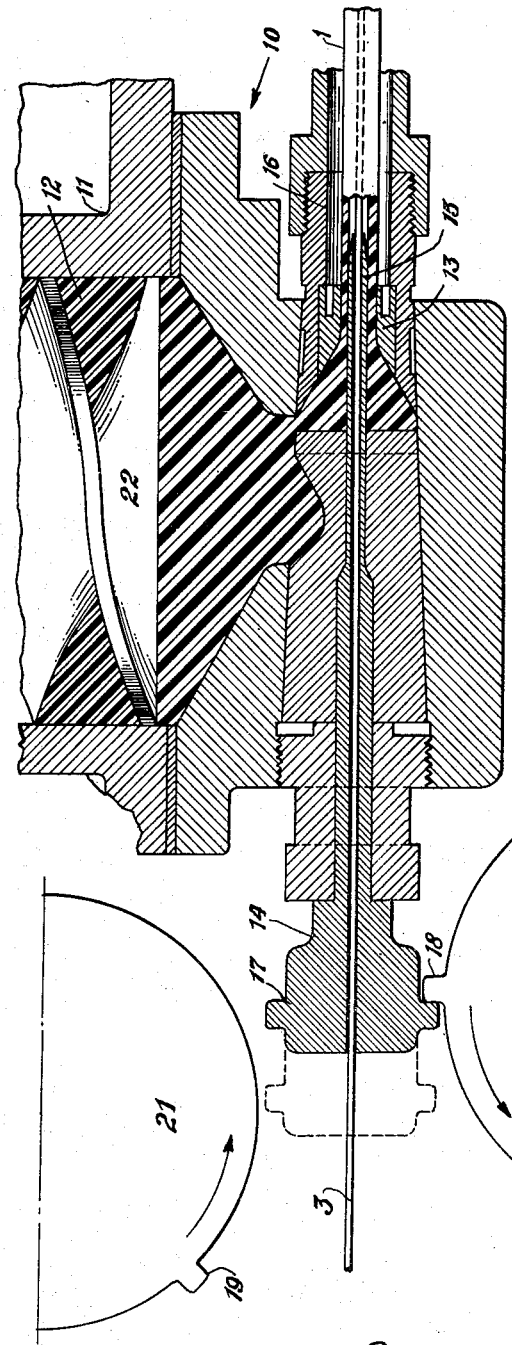
INVENTOR.
George A. Brace
BY
Harry S. Dumarer
ATTORNEY.

Patented Dec. 1, 1953

2,661,025

UNITED STATES PATENT OFFICE 2,661,025

FLEXIBLE HOSE

George A. Brace, Highland Park, Ill., assignor to The Hoover Company, North Canton, Ohio, a corporation of Ohio Application April 3, 1948, Serial No. 18,780

2 Claims. (Cl. 138—56)

This invention relates to a flexible hose particularly adapted for use with suction cleaners and to the method of making the same.

A hose for use with suction cleaners must be flexible for ease in manipulating the hand tools and be rigid to resist compressive forces so that it will not collapse when trod upon by the operator.

In order to make hose rigid to compressive forces it has been proposed to seal a reinforcing wire into the walls of the hose between two layers of thermoplastic material. In the past the reinforcing wire has been sealed in the walls of the hose so that it has no freedom of movement with the result that the hose is too rigid and unadaptable for use with suction cleaners. Flexible hose has also been made with a reinforcing wire lying between two layers of thermoplastic material in which the reinforcing wire has freedom of movement but the layers of thermoplastic material can also move relative to each other. If the hose liner is not secured to the covering the liner will collapse due to the low suction pressure in the hose.

According to this invention, the necessity for separate inner and outer layers is eliminated. The entire wall thickness including the inner wall and the outer wall with the reinforcing wire therebetween is formed simultaneously in a single extrusion process. The recess between the inner and outer walls in which the reinforcing wire lies is made larger than the wire to permit the wire freedom of movement so as to render the finished hose sufficiently flexible.

Normally the hose for a suction cleaner is cut to suitable lengths and the necessary connecting fittings are attached to the ends. Hose having the desired flexibility must be reinforced adjacent the couplings to avoid premature rupture and failure at this point.

According to this invention the space between the inner and outer walls of the hose, in which the reinforcing wire lies, is periodically reduced in cross-sectional area so that the material of the walls completely embraces the reinforcing wire. This unique construction provides a hose with the desired reinforcement at its ends and permits a superior connection with the coupling fittings.

According to this invention, a continuous hose can be made having reinforced portions spaced along its length at a distance substantially equal to the length of the section needed. Flexible sections having reinforced ends can be formed from the continuous hose by cutting it intermediate the length of the reinforced portions.

More specifically according to this invention, the reinforcing wire is passed through a guide tube of an extruding machine and thermoplastic material is extruded about the wire. The guide tube is so formed and positioned relative to the die of the extruder that the thermoplastic material does not closely embrace the wire. The die is so shaped as to form a comparatively wide strip or tape having inclined or other shaped edges so that when wound on the mandrel the edges of the tape will overlap in matching relation to one another. The tape thus formed is wound about a mandrel as the overlapping edges are heat-sealed to each other.

Periodically the combined wire guide and cavity die of the extruding machine is drawn backwardly sufficiently to permit the thermoplastic material to completely embrace the reinforcing wire. This occurs at regular intervals so spaced that sufficient tape is extruded having both solid and hollow sections to form reinforced end hose sections of the desired length.

Stated differently, sufficient solid tape is extruded to form a single reinforced end. Next sufficient hollow tape is extruded to form the main flexible body of a hose section of desired length. Then sufficient solid tape is extruded to form the reinforcing ends of the first and second sections.

The continuous tape thus formed is wrapped on a reel for future use in a hose winding and sealing machine, or the tape may be fed directly to the hose making machine. The winding and sealing machine winds the tape with the reinforcing wire therein about a mandrel with the mating edges of the tape overlapping and simultaneously heat-seals the edges together to form a long length of hose.

Due to the way the tape is extruded about the wire the completed hose will comprise, first, a short relatively stiff length in which the plastic material closely embraces the reinforcing wire and then a comparatively long relatively flexible length of hose in which the reinforcing wire extends through a cavity located entirely between the inner and outer walls of the hose. Since the resultant continuous hose is formed with alternate flexible and relatively non-flexible portions, it will be clear that it can be severed at the relatively non-flexible sections to form a plurality of flexible sections each having reinforced ends.

Other objects and advantages of this invention will become apparent as the description proceeds when taken in connection with the accompanying drawings in which:

Figure 1 shows an extruder for forming reinforced plastic tape;

Figure 3 is a longitudinal cross-sectional view of the finished hose according to this invention.

Figure 2:
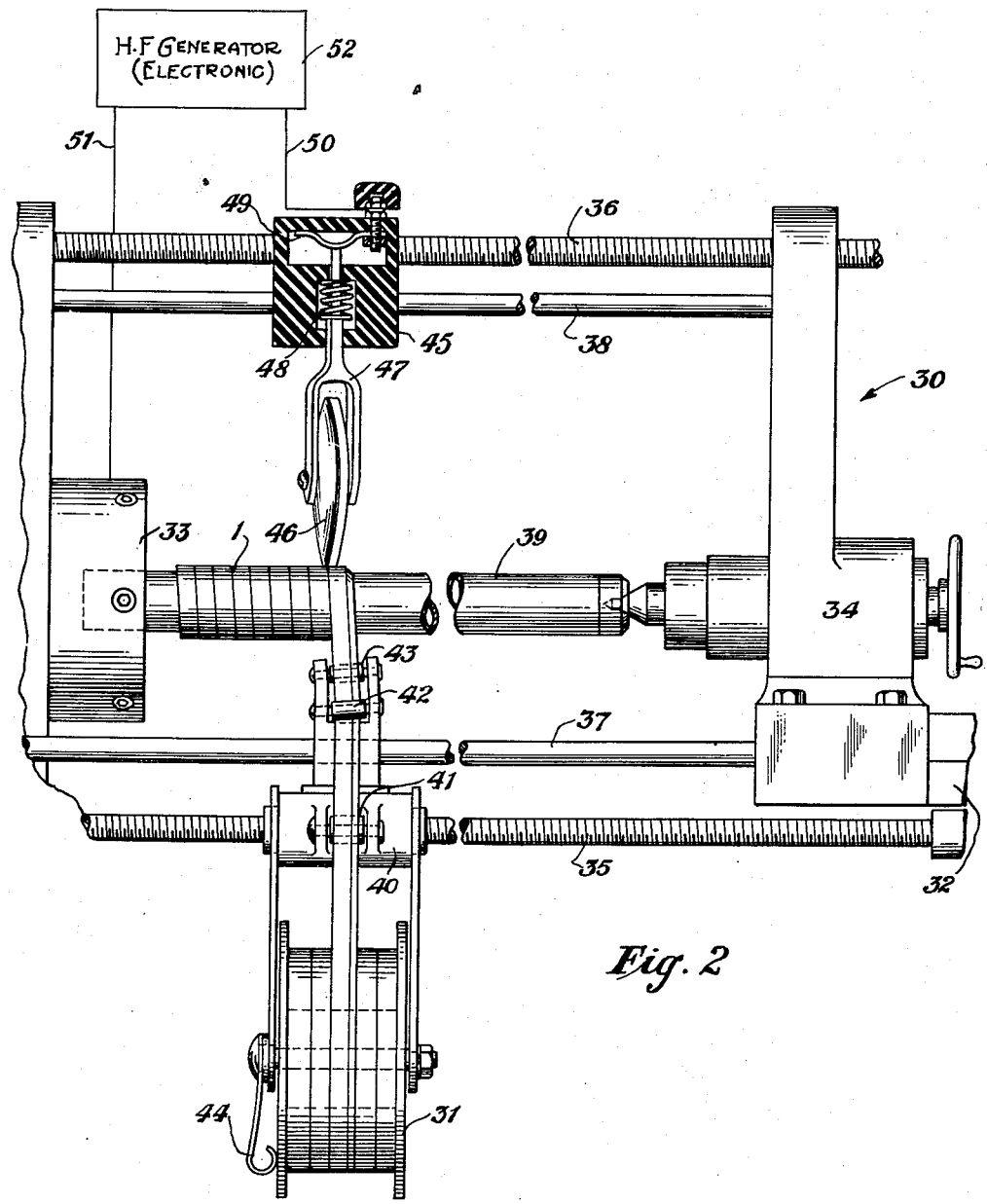
Figure 2 shows a winding and heat-sealing machine for making continuous hose from the reinforced tape.

Referring to Fig. 3, the finished hose of this invention is formed of a spirally wound tape 1 of thermoplastic material having mating edges 2 heat-sealed together and a reinforcing wire 3 sealed within the interior of the body of the thermoplastic tape. The hose is made in long lengths and is adapted to be severed on the severance lines A—A of Fig. 3 to form hose sections of the length desired. It will of course be appreciated that in certain applications it will be desirable to sever the hose midway of the flexible portions to provide sections having relatively stiff main portions and flexible ends.

It is to be noted that at the severance line A—A and the two turns of tape adjacent thereto, the material of the tape 1 completely embraces the reinforcing wire 3 while the tape of other turns have a cavity 4 in which the flattened reinforcing wire 3 lies. The space 4 is shown exaggerated in the drawing for clarity in illustration. The cross-section dimensions of the cavity can of course be varied over a considerable range to provide the degree of flexibility desired in the finished hose.

The first step in making the hose of this invention may be carried out by the extruder of Fig. 1, generally indicated by the reference numeral 10. The main parts of the extruding machine 10 comprise a receptacle 11 to receive the thermoplastic material 12, an extruding die 13 and a combined reinforcing wire guide and internal die 14. The interior of tube 14 is of a shape to slidably receive the reinforcing wire 3 while its exterior is shaped to form cavity 4 in the tape as will be readily understood. Die 13 is formed to make tape of the desired exterior contour such, for example, as tape 1 shown in Fig. 3. The inner end 15 of the pilot tube 14 extends entirely through the die 13 into the interior of a cooling jacket 16 while forming hollow tape. It is withdrawn rearwardly when making the solid tape. To accomplish this, the rear end of the guide tube 14 is provided with the collar 17 which cooperates with lugs 18 and 19 mounted on rotating wheels 20 and 21 respectively. These wheels are geared to suitable rollers (not shown) which advance the reinforcing wire 3 through pilot 14 and to the finished tape reel (not shown). Screw 22 which feeds the thermoplastic material 12 into the die 13 may also be connected to the same common driving means. The wheels 20 and 21 rotate in the direction of the arrows shown in Fig. 1.

When the parts of the extruder 10 are in the position shown in Fig. 1, screw 22 rotates to force the thermoplastic material 12 into the die 13 about pilot tube 14 as the reinforcing wire 3 advances axially to the right. As the thermoplastic material emerges from the die 13 it is immediately cooled by the cooling fluid in the cooling jacket 16 and takes a permanent set. Since the end of the pilot 14 is located opposite the cooling and setting zone, a cavity of the same cross-section as that of the pilot is formed within the tape and about the reinforcing wire.

Wheels 20 and 21 are rotated in unison with the screw 22 and the rollers which advance the reinforcing wire 3 through the guide tube 14.

Eventually, lug 18 on wheel 20 will engage the collar 17 and move the pilot tube 14 rearwardly sufficiently to allow the plastic material to fill the entire space between wire 3 and die 13 and form a solid section of tape. The rearmost position of pilot 14 is indicated by dotted lines in Fig. 1. The rate at which the pilot is withdrawn and advanced determines the progressive decrease or increase in the cross-section of cavity 4. This progressive decrease of the size of the space 4 is clearly shown in Fig. 3.

By the time the lug 18 has released the collar 17, the lug 19 will have moved into a position just out of contact with the collar 17. After a short length of solid tape has been extruded lug 19 on wheel 21 will engage the collar 17 and move the pilot back to its original position. During this action cavity 4 surrounding wire 3 will progressively increase back to the maximum size such as that shown in Fig. 3.

Referring now to the hose making machine 30, shown in Fig. 2, it will be seen that it includes a bed plate 32, a rotating head 33, a tail stock 34, two feed screws 35 and 36, and two guide rods 37 and 38. A mandrel 39, upon which the tape 1 is to be wound, is rotatably supported by the rotating head 33 and the tail stock 34.

A carriage 40 is carried by the feed screw 35 and the guide rod 37. It is adapted to be moved parallel to the bedplate 32 by the screw 35. Mounted on the carriage 40 are guide rollers 41, 42, and 43 for the tape 1, and the reel 31. A suitable brake 44 resists rotation of the reel 31 so as to apply the proper tension to the tape 1 as it is wound on the mandrel 39.

A carriage 45 is carried by the lead screw 36 and guide rod 38 and is adapted to be advanced with the cariage 40 by rotating screw 36. The carriage 45 carries a sealing roller 46 by means of a bracket 47 which is spring-pressed downwardly by a spring 48. Carriage 45 is made of insulating material and carries a contact element 49 engaging the end of the bracket 47 which is connected by conductor 50 to one side of a high frequency generator 52, the other side of which is connected in any suitable manner to the rotating head 33. For example, the conductor 51 may be connected to a brush engaging a slip ring carried by the rotating head 33. The mandrel 39 will then form one electrode of the high frequency generator 52, roller 46 will form the other and the tape 1 will form the dielectric to be heated.

In operation, reel 31 is mounted on the carriage 40, the end of the tape 1 is threaded through the rollers 41, 42, and 43, and wrapped around the left hand end of the mandrel for at least one turn with the adjacent edges 2 overlapping. The brake 44 is applied to the reel 31 to properly tension the tape 1 and the electrode roller 46 is positioned over the overlapping edges 2 of the tape.

The driving motor for the rotating head 33 and the high frequency generator 52 are then simultaneously energized. The screw 35 will advance the carriage 40 as the mandrel 39 is rotated so that the tape will be spirally wound about the mandrel with its edges overlapping. The screw 36 will advance the carriage 45 so that the roller 46 will follow the seam between the overlapping edges 2 of the tape 1.

Thus, a high frequency electric field is produced in the overlapping edges 2 of the tape. The overlapping edges 2 of the tape are thus dielectrically heated sufficiently to weld them firmly together to form a continuous fluid tight hose. The heat dissipating properties of the mandrel 39 and of the electrode roller 46 are such that the heat produced is speedily carried away from the inner and outer surfaces of the tape 1.

The mandrel 39 is long enough to make a hose from which a plurality of sections of suction cleaner hose can be cut. After such a length has been formed mandrel 39 is replaced by an identical mandrel. Meanwhile, the finished hose may be cut at the severance line, such as A—A illustrated in Fig. 3, and removed from the mandrel in any suitable manner.

The wire 3 is preferably made of a flat configuration as shown so that it be spirally wound more easily but it may be made of any configuration desired.

While the hose of this invention and the method of making it has been described as particularly useful as a suction cleaner hose it is to be understood that it has much wider application in that the hose may be used for many other purposes such as garden hose, dispensing hose and hose for many other uses.

It will also be apparent that for certain applications of the invention it may be desirable to employ a hose having flexible ends and one or more relatively non-flexible mid-sections. For example, short flexible mid-sections flanked by non-flexible sections would facilitate the laying of a generally rigid hose around corners.

While I have shown but a single embodiment of my invention it is to be understood that this embodiment is to be taken as illustrative only and not in a limiting sense. I do not wish to be limited to the particular structure and method shown and described but to include all equivalent variations thereof except as limited by the scope of the claims.

I claim:

1. An extruded strip for use in the manufacture of flexible hose comprising, a flat elongated tape and a reinforcing wire sealed therein, the material of said tape alternately closely embracing said reinforcing wire for an interval of length and being spaced therefrom for an interval of length.

2. A flexible hose adapted to be cut into short lengths having a flexible mid-section and relatively stiff ends comprising, a flexible wall of non-metallic material and a helically wound metallic reinforcing wire sealed within said walls, the material of said walls closely embracing said wire for portions of the length of the hose to form said relatively stiff ends and being spaced from said wire between said relatively stiff ends so as to have limited movement relative to said wire at said flexible sections whereby said hose may be severed at said relatively stiff ends to form a plurality of flexible hose lengths having relatively stiff ends and a flexible intermediate section.

GEO. A. BRACE.

References Cited in the file of this patent

UNITED STATES PATENTS

| Number | Name | Date |
| --- | --- | --- |
| 1,281,557 | Goodall | Oct. 15, 1918 |
| 1,314,670 | Juve et al. | Sept. 2, 1919 |
| 1,394,300 | Gammeter | Oct. 18, 1921 |
| 1,576,588 | Finstone | Mar. 16, 1926 |
| 1,622,397 | Schlaich | Mar. 29, 1927 |
| 1,746,701 | Kimmich | Feb. 11, 1930 |
| 2,125,447 | Jacobson | Aug. 2, 1938 |
| 2,225,026 | Welsh | Dec. 17, 1940 |
| 2,226,043 | Weaver | Dec. 24, 1940 |
| 2,260,282 | Grint | Oct. 28, 1941 |
| 2,321,064 | Broedling | June 8, 1943 |
| 2,392,992 | Martin | Jan. 15, 1946 |
| 2,396,059 | Roberts | Mar. 5, 1946 |
| 2,446,057 | Morin | July 27, 1948 |
| 2,465,482 | Rhodes | Mar. 29, 1949 |
| 2,472,483 | Krippendorf | June 7, 1949 |
| 2,472,484 | Krippendorf | June 7, 1949 |
| 2,472,485 | Krippendorf | June 7, 1949 |